(12) United States Patent
Valdez et al.

(10) Patent No.: US 8,459,298 B1
(45) Date of Patent: Jun. 11, 2013

(54) CHECK VALVE FOR DRAIN PIPES

(75) Inventors: William T. Valdez, Oceanside, CA (US); Timothy J. Morrison, Oceanside, CA (US)

(73) Assignee: Free Flow Products, LLC, Oceanside, CA (US)

( * ) Notice: Subject to any disclaimer, the term of this patent is extended or adjusted under 35 U.S.C. 154(b) by 346 days.

(21) Appl. No.: 11/715,815

(22) Filed: Mar. 8, 2007

Related U.S. Application Data

(60) Provisional application No. 60/780,512, filed on Mar. 9, 2006.

(51) Int. Cl.
*F16K 21/06* (2006.01)

(52) U.S. Cl.
USPC .................. 137/527.6; 137/514; 137/315.16; 43/66

(58) Field of Classification Search
USPC ............ 137/514, 527, 527.6, 315.16, 315.07, 137/527.8; 210/446; 43/66
See application file for complete search history.

(56) References Cited

U.S. PATENT DOCUMENTS

| | | | | |
|---|---|---|---|---|
| 929,514 | A * | 7/1909 | Tenold | 210/131 |
| 1,000,719 | A * | 8/1911 | Cram | 210/117 |
| 1,354,879 | A * | 10/1920 | Boland | 210/123 |
| 4,039,004 | A * | 8/1977 | Luthy | 137/527 |
| 4,396,034 | A * | 8/1983 | Cherniak | 137/514 |
| 4,867,802 | A * | 9/1989 | Earl | 137/526 |
| 7,240,378 | B2 * | 7/2007 | Long et al. | 4/252.1 |
| 2005/0092372 | A1 * | 5/2005 | Wade | 137/527.6 |

* cited by examiner

*Primary Examiner* — Kevin Lee
*Assistant Examiner* — Macade Brown
(74) *Attorney, Agent, or Firm* — The Eclipse Group LLP

(57) ABSTRACT

A check valve for deterring intrusion into drain pipes comprises a body member having at least a first orifice and configured to mount on a drain pipe wherein the drain pipe is adapted to promote fluid flow in a single direction. Pivotably mounted on said body member will be a valve member. The mounting arrangement will provide a closed position that substantially occludes the first orifice and a range of open positions when the valve member is pivoted to open in the flow direction. In addition, at least one additional orifice is provided in either the body member or the valve member to permit fluid flow irrespective of the position of the valve member.

4 Claims, 7 Drawing Sheets

CHECK VALVE FOR DRAIN PIPES

CROSS-REFERENCE TO RELATED APPLICATIONS

This application claims priority under 35 U.S.C. §119(e) to U.S. Provisional Patent Application Ser. No. 60/780,512 filed Mar. 9, 2006.

FIELD OF THE INVENTION

The present invention relates to commercial, residential and public drainage systems where flow of effluent through pipes is required and intrusion by animals and the like into the drain pipes is not desirable. More particularly, the present invention relates to valve devices that may be installed into existing systems, incorporated into new systems or built into the drain pipes and that deter intrusion into such systems.

BACKGROUND OF THE INVENTION

Proper land drainage is an important aspect of any structural, landscaping, industrial or residential undertaking. Standing effluent can infiltrate and undermine slabs and other structural foundations. A systematic use of sand, gravel, grading and drainage pipes, familiar to those skilled in the art, are employed to facilitate drainage of effluent, typically rain effluent, away from primary structures. The drainage pipes typically exit onto a street or gutter leading to municipal drainage systems. Since the drain courses through an underground system, there is opportunity for roots, dirt and other debris to be gathered into the pipe system. A simple grate placed at the end of the drain pipe to deter intrusion restricts the flow of effluent and corresponding debris. The accumulation of debris can contribute to a back up of effluent or the cover may be expelled and washed away by heavy effluent flow. Due to problems arising from grating the ends of the pipes and the potential environmental clutter associated with washed out drains, solid grated end covers are seldom used.

In addition to the above technical and functional aspects of proper drainage system design, there are numerous species of animals that can be found in proximity to residential, industrial and other structures. These animals typically require a nesting ground or other safe haven from which they may venture forth in search of food, nesting materials, etc. An unguarded drain pipe at street level provides ideal conditions for any number of small animals, such as reptiles, rodents, amphibians, birds and the like. With the suburban sprawl associated with many areas of the country, large populations of animals are taking refuge in and near residential, commercial and other neighborhoods where they are considered undesirable pests.

Currently there are a number of plastic covers or grates on the market for rainwater drainage. The products are typically of monolithic construction with no moving parts. These grates, if placed over drainage pipe exits, require frequent maintenance due to debris collecting within the pipe. In addition, the flow of effluent is restricted, leading to deposition of debris further inside the pipe and, in some cases, complete blockage by the grate protecting the drain exit from intrusion. For this reason grates are seldom used in practice.

One example of a grate intended to deter intrusion by animals but address the restriction of effluent flow is disclosed in U.S. Pat. No. 5,102,537. It is clear that such a grate will be of limited utility in deterring the wide range of animals that typically colonize drainage systems.

Another device intended to deter intrusion without hindering effluent flow is disclosed in U.S. Pat. No. 4,702,828. This device is similarly of limited utility in deterring the wide range of animals that typically colonize drainage systems.

DISCLOSURE OF THE INVENTION

The present invention meets the above needs by providing a check valve for drain pipes. According to one aspect of the invention, a check valve for deterring intrusion into drain pipes comprises a body member having at least a first orifice and configured to mount on a drain pipe wherein the drain pipe is adapted to promote fluid flow in a single direction. Pivotably mounted on said body member will be a valve member. The mounting arrangement will provide a closed position that substantially occludes the first orifice and a range of open positions when the valve member is pivoted to open in the flow direction. In addition, at least one additional orifice is provided in either the body member or the valve member to permit fluid flow irrespective of the position of the valve member.

The advantages of the present invention over conventional drain pipe covers and grates are that the present check valve device will allow for increased flow of effluent on demand. The features which differentiate various embodiments of the present device from the prior art are simplified construction, features which enable simple field installation of the device without tools due to open ended construction with barb projections on the perimeter, debris directing internal grates, an information display surface and serrations or points on the edge of the valve member that catch animals attempting to burrow underneath and said serrations penetrate debris left in the drain pipe allowing for more consistent closure, an internally expanding band with conforming sections to minimize pipe restriction, and a self-closing functionality.

BRIEF DESCRIPTION OF DRAWINGS

FIG. 11 is a perspective view of an alternative embodiment of the present check valve device demonstrating a round external valve member having a spring to exert force to augment closure of the valve member into the closed position, in which:

DETAILED DESCRIPTION OF THE INVENTION

The present invention provides a check valve for deterring intrusion into drain pipes comprises a body member having at least a first orifice and configured to mount on a drain pipe wherein the drain pipe is adapted to promote fluid flow in a single direction. Pivotably mounted on said body member will be a valve member. The mounting arrangement will provide a closed position that substantially occludes the first orifice and a range of open positions when the valve member is pivoted to open in the flow direction. In addition, at least one additional orifice is provided in either the body member or the valve member to permit fluid flow irrespective of the position of the valve member.

This invention is intended to integrate into a system that accommodates the unobstructed flow of effluent and other debris away from a structure while protecting the drain system from occupation by animals.

Figure 1:
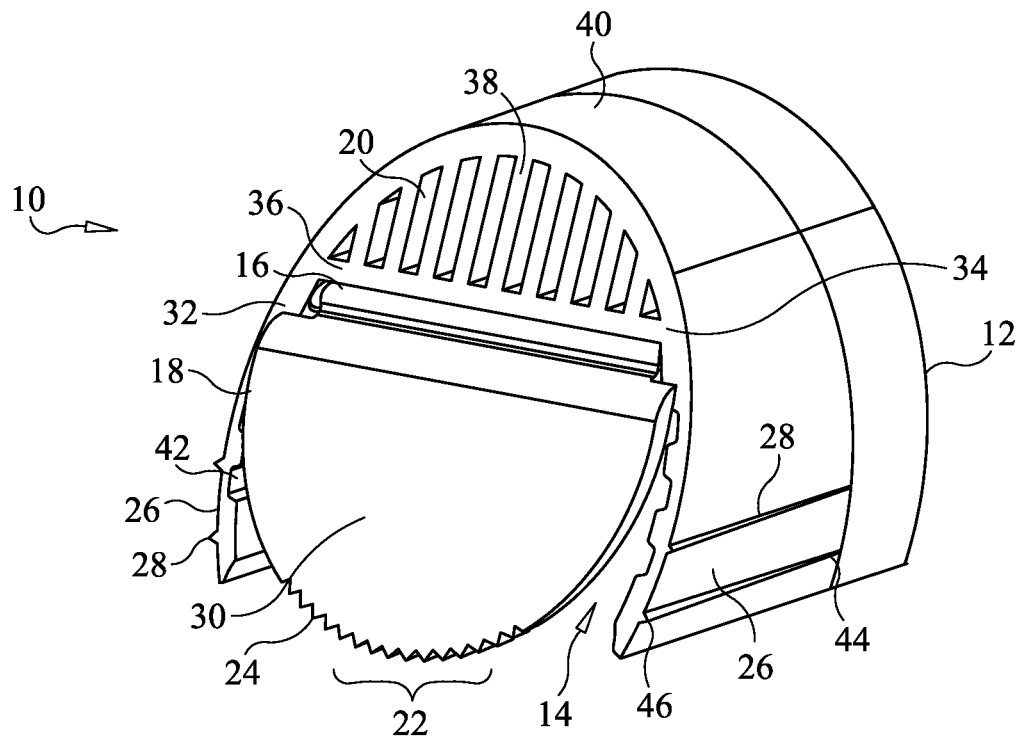
FIG. 1 is a perspective view of an embodiment of the present check valve device depicting external features.
Figure 2:
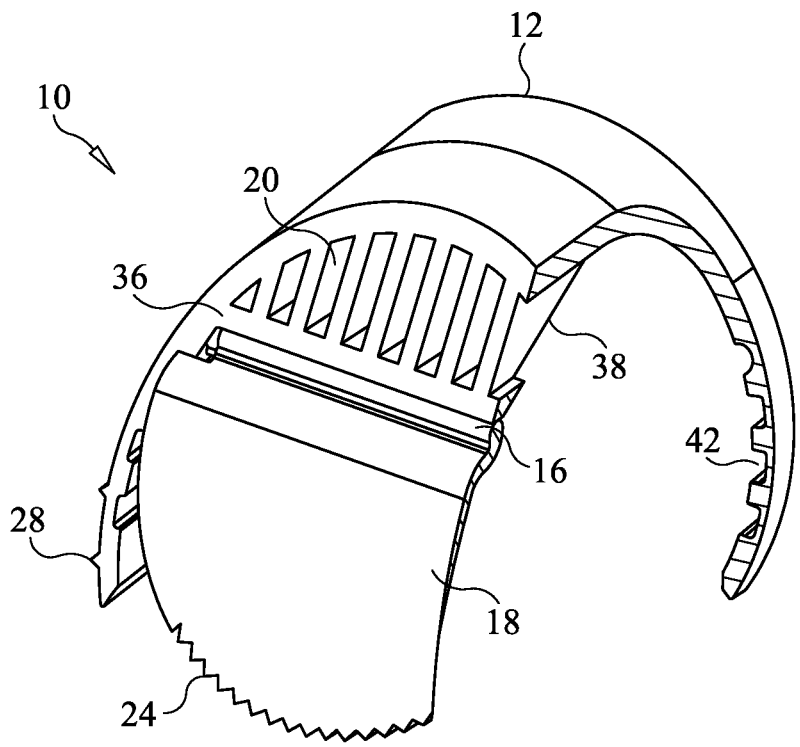
FIG. 2 is a perspective view with portions broken away of the embodiment of the check valve device of FIG. 1 depicting internal features.
Figure 3:
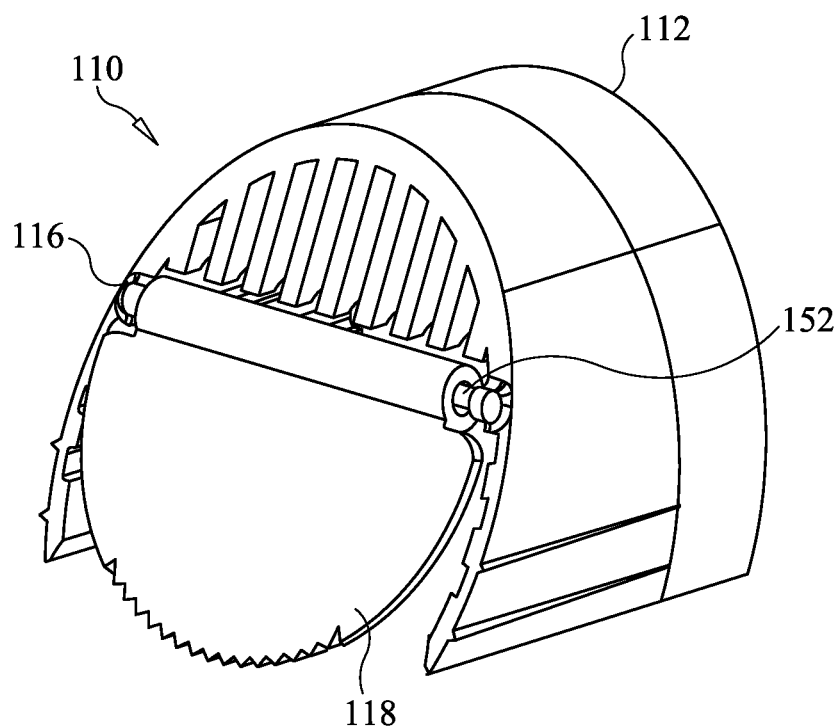
FIG. 3 is a perspective view with portions broken away of an alternative embodiment of the pivotal mount hinge incorporated into the embodiment of the check valve device of FIG. 1.

A description of a number of embodiments of the present check valve device is provided below, and with reference to the accompanying drawings, where like numerals refer to like structural elements. As depicted in FIGS. 1, 2 and 3, a presently preferred embodiment of the present check valve device 10 is comprised of a body member 12 that is configured to permit the present device to be attached to a drain pipe, either detachably or permanently. Body member 12 defines an orifice 14 for effluent flow, and also serves as a structural element for pivot or hinge point 16 of valve member 18 portion of check valve device 10. In addition, body member 12 includes at least one additional orifice 20 (shown in the Figure as a plurality of orifices forming a grate). The orifice 20 of body member 12 accommodates additional effluent flow. Body member 12 is shown as relieved 22 at the lowest side to allow unrestricted flow of effluent, and to eliminate a "riffle" that would provide a locus for settling of particulate debris. The lower rim of valve member 18 is serrated 24 to provide functions as described below.

Figure 11A:
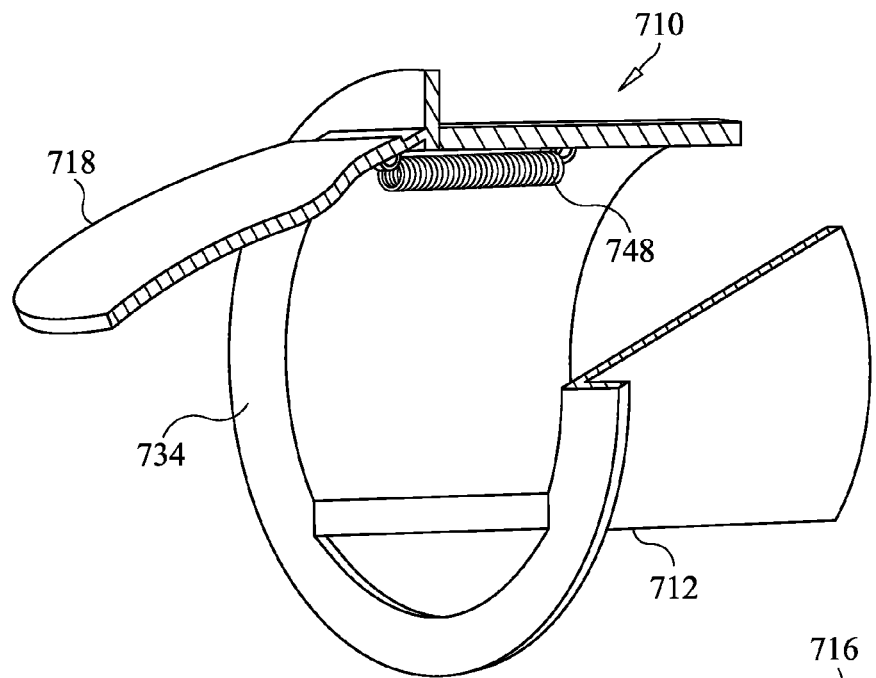
FIG. 11A depicts the valve member in an opened position.
Figure 11B:
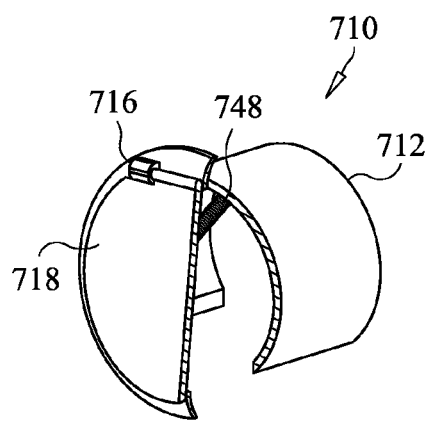
FIG. 11B depicts the valve member in the closed position.

Conventional drain pipes are typically of circular cross section, and thus most embodiments of the present check valve device will utilize body members that conform generally to the standard geometries. However, it will be readily apparent that other geometries can easily be accommodated by the present invention. Such conventional drain pipes have tolerances associated with their manufacture. During installation in a drainage system, however, the pipe may be deformed in excess of the manufacturer's tolerance, so the preferred embodiment includes the ability to adapt to such unintended dimensions. Coupled with relief 22 in body member 12, lower side portions 26 of body member 12 will allow check valve 10 to bias against the inner walls of the pipe and center hinge 16 inside the pipe. Additional engagement between body member 12 and the drain pipe is facilitated though the addition of several projections or barbs 28 located around the perimeter 40 of body member 12. Ingress through the present check valve 10 from the direction opposite to the effluent flow is normally blocked by the closed valve member 18, which can be passively self-closing or can optionally include an active closure capability, such as a spring or other positioning element, as shown in FIG. 11. Upon occasion small elements of debris may become entrapped and partially hold valve member 18 open. Failure of valve member 18 to fully close is mitigated by serrations, scallops or other edge effects 24 (generically termed "serration") located on the lower edge of valve member 18. When valve member 18 is held partially open by such debris, thus permitting an animal to attempt burrowing under valve member 18, serration 24 serves to catch on the animal and further close valve member 18 onto the animal attempting to burrow underneath.

A further aspect of this invention is the opportunity for curbside advertisement of the installer's business, service logo, or other desired information. Valve member 18 or alternatively body member 12 can each provide a desirable information display region 30 for advertisements that will be visible to persons near the drainage exit.

In summary, the preferred embodiment provides a check valve device 10 comprised of a body member 12 and a valve member 14 connected via a pivot hinge point 16. Pivot hinge mechanism 16 is designed such that detent recesses can be molded into body member 12 and pivot pin projections molded into valve member 18. Valve member 18 is relieved in corners 32 to allow for full closure and seating against sealing surface 34 of body member 12. The valve member 18 and body member sealing surface 34 are positioned on an angle of approximately 40 to 75 degrees from horizontal to ensure sufficient closure force is applied by gravity between valve member 18 and body member 12. A support bar 36 extends across the width of body member 12 and prevents pinching of the integrally molded pivot hinge assembly 16. Various sizes of orifice grate openings 20 are separated by effluent directors 38. Such effluent directors 38 are angularly oriented internally to body member 12 (as depicted in FIG. 2) such that they direct debris and effluent towards valve member 18. The outside perimeter 40 of body member 12 corresponds with the average internal diameter of the standard drain pipe where the present check valve device 10 is being installed.

Adjacent sections of lower side portions 26 of body member 12 are of a significantly larger diameter such that an external force is applied to the interior of the drain pipe. A number of hinge regions 42 are provided along the interior of check valve device 10 to ensure close matching between the exterior of body member 12 of check valve device 10 and the interior of the drain pipe. In addition, a number of barb projections 28 are engaged onto the interior of the drain pipe through said external force. The barb projections 28 are feathered from the rear portion 44 of body member 12 at the exterior of body member 12 to an end transition 46, and the abrupt disruption of the barb projection 28 allows it to engage with the interior of the drain pipe and resist extraction. The lower portion 22 of body member 12 is left open 14 to resist clogging of the drain pipe and to reduce sediment build up due to the lower edge of body member 12. During times of lower effluent flow rates the debris will settle out of the effluent and may build up in other embodiments of the invention.

The present invention can be constructed of any available construction material, with plastic being advantageous for ease of fabrication and low cost. The check valve can also be sold fully assembled, or as components to permit assembly on-site. This can be advantageous where, for example, the hinge mechanism 16 consists of molded-in projections on the valve member 18 and molded detents in the body member 12. In such a hinge configuration, the valve member 18 can be fitted to the body member 12 as the check valve is inserted into the drain pipe, and the body member conforms to the geometry of the drain pipe. In this manner, and tendency of valve member 18 and hinge mechanism 16 to bind can be adjusted on site, for example, by simply removing excess material as desired.

An alternate embodiment of the check valve 110 of the invention is depicted in FIG. 3, and in such an embodiment valve member 118 is attached to body member 112 by means of an alternate hinge mechanism 116 wherein valve member 118 pivots about an axle 152 that is mounted to body member 112.

Figure 4:
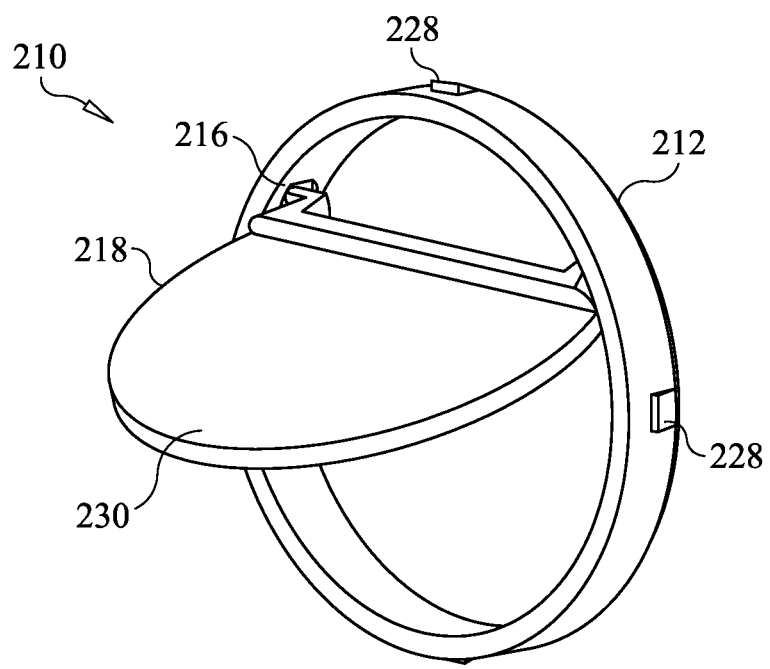
FIG. 4 is a perspective view of an alternative embodiment of the present check valve device depicting external features including an alternative embodiment of the pivotal mount hinge and a projection for securing the body member to the drain pipe.

Another alternative embodiment is depicted in FIG. 4 wherein check valve 210 is a lower cost version with a valve member 218 that snaps into a pivot hinge 216 of body member 212. Body member 212 of check valve device 210 may be oriented vertically as shown to reduce tooling costs or angled such that the valve member 218 seats in the closed position. The alternate assembly may contain a simpler barb projection mechanism 228 to assist in retaining check valve device 210 in the drain pipe. A visible marketing or information display surface 230 can also be provided in the simplified version.

Figure 5:
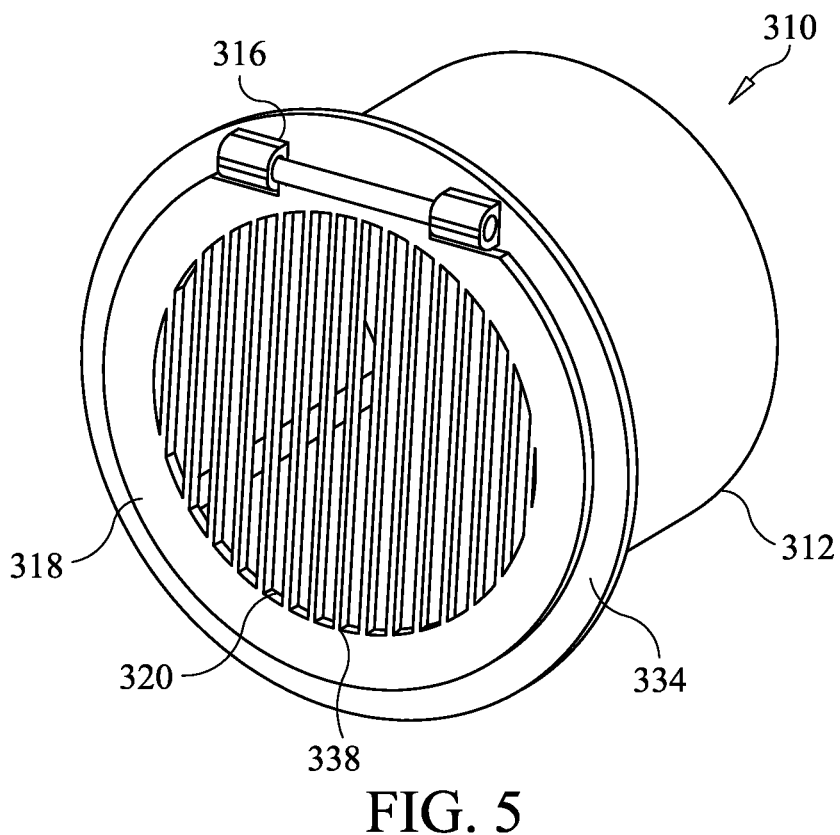
FIG. 5 is a perspective view of an alternative embodiment of the present check valve device demonstrating a round external valve member.
Figure 6:
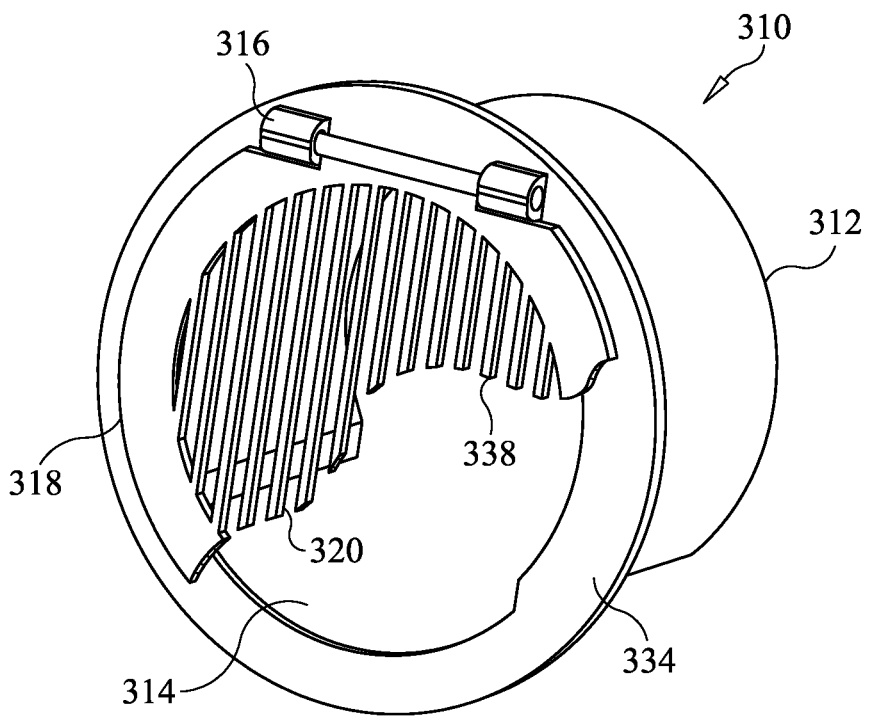
FIG. 6 is a perspective view with portions broken away of the embodiment of FIG. 5.

Another alternative embodiment of the check valve device 310 in accordance with the invention is depicted in FIGS. 5 and 6 wherein the hinge mechanism 316 is located at the top of the valve member 318. Valve member 318 is located at external surface 334 of body member 312. As a result, valve member 318 can fully cover the orifice 314 and reach an extended open position during heavy effluent flow. In addition, in this and other embodiments valve member 318 can contain a grate region (consisting of at least one additional orifice 320 optionally divided by deflectors 338) in valve member 318 to allow additional flow of effluent. The lower portion of body member 312 can also be eliminated to prevent build up of debris and sediment.

Figure 7:
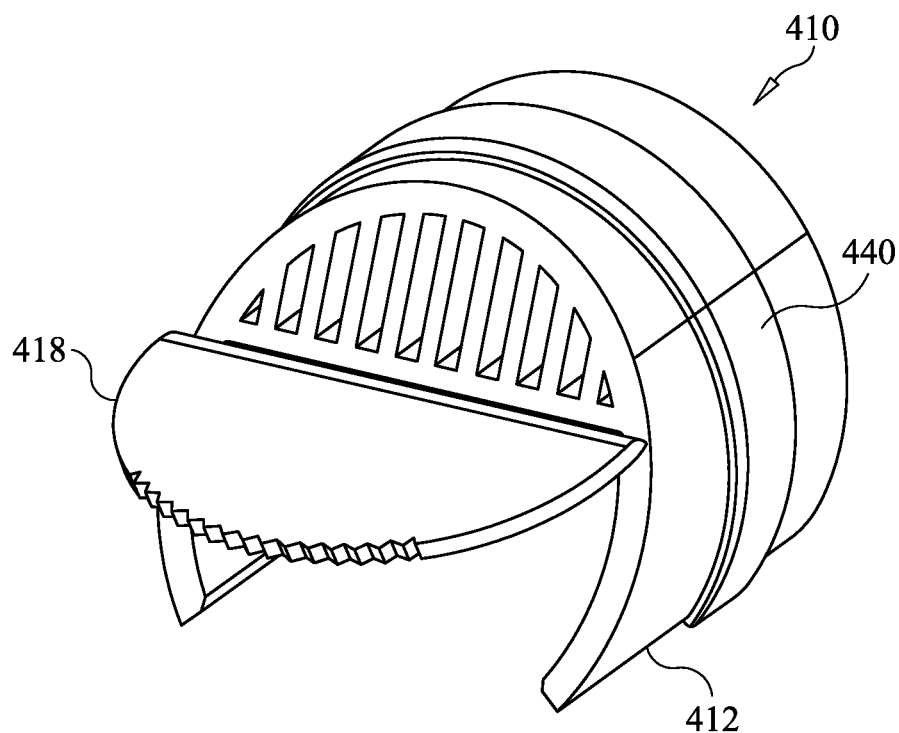
FIG. 7 is a perspective view of an alternative embodiment of the present check valve device generally in accordance with FIG. 1 that has been adapted to be glued in place in the drain pipe.

Yet another alternative embodiment is depicted in FIG. 7 in which check valve device 410 is retained in the drain pipe by use of a glue to affix body member 412 to the interior of the drain pipe. The glue may be applied externally on the perimeter 440 of body member 412 or internally onto the interior of the drain pipe.

Figure 8:
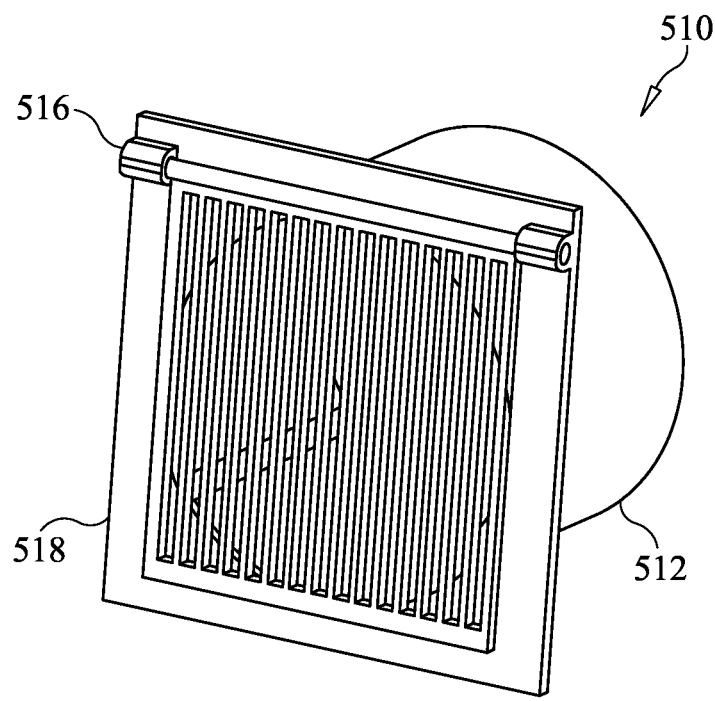
FIG. 8 is a is a perspective view of an alternative embodiment of the present check valve device demonstrating a rectangular external valve member.
Figure 9:
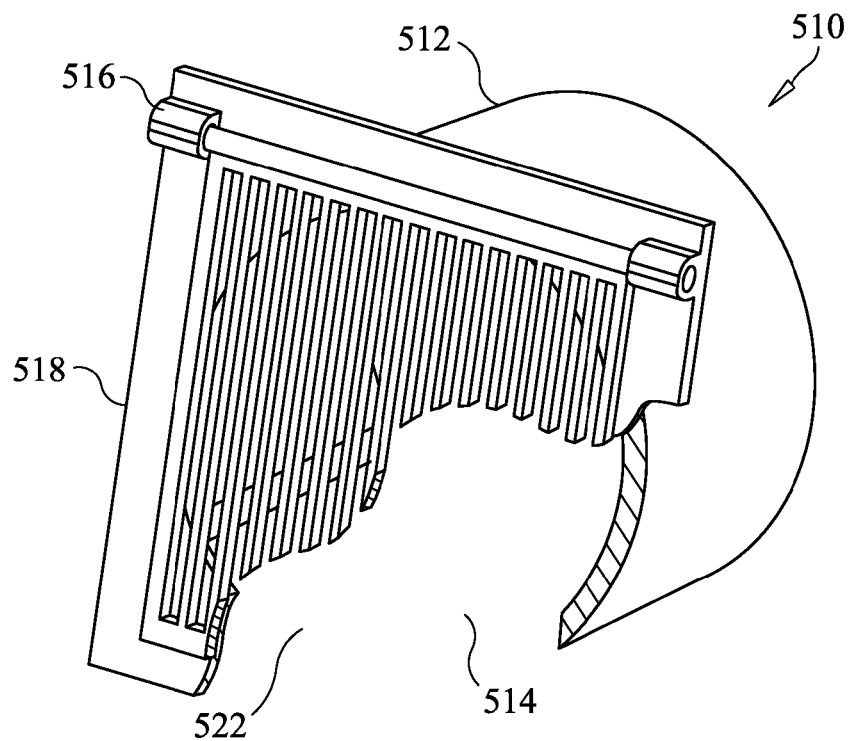
FIG. 9 is a perspective view with portions broken away of the embodiment of FIG. 8.

A further alternative embodiment of the present check valve device 510 as depicted in FIGS. 8 and 9 is one in which valve member 518 is externally mounted on body member 512 utilizing an alternative hinge mechanism 516. Valve member 518 while depicted as a quadrilateral can assume any of numerous geometric shapes provided valve member 518 is of sufficient internal geometry to adequately cover exit orifice 514 of body member 512 mounted to the effluent drain pipe. Also, in this and numerous other embodiments, relief 522 can be provided in the lower portion of body member 512.

Figure 10:
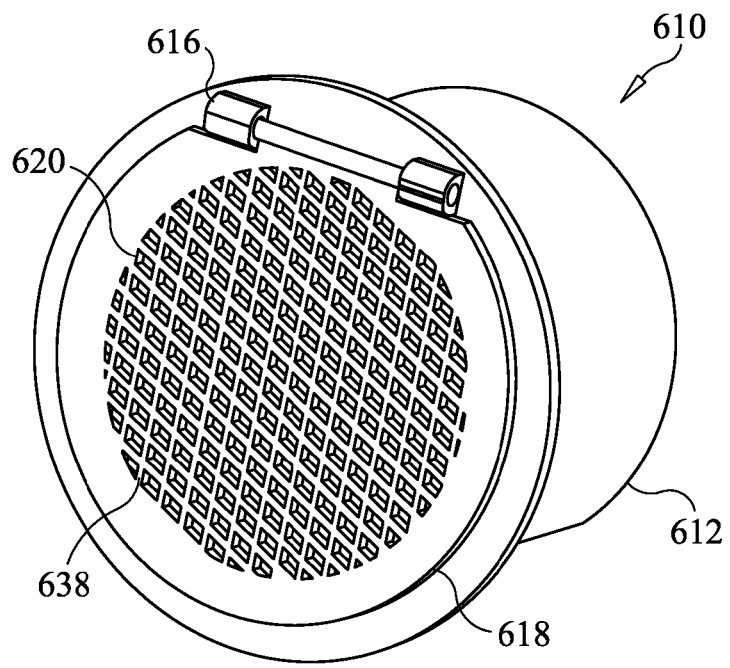
FIG. 10 is a perspective view of an alternative embodiment of the present check valve device demonstrating a round external valve member with an alternate embodiment of the orifice grate configuration.

A still further embodiment of the invention as depicted in FIG. 10 is one where valve member 618 has a plurality of additional orifices 620 which are crossed at an angle by deflectors 638 leaving diamond shaped holes. The holes of the grate region may be various shapes including circular, square, triangular or sections of an arc. The purpose of the additional openings is to allow additional effluent flow, however larger openings would permit small animals to penetrate the check valve 610.

Yet an additional embodiment of the invention is depicted in FIG. 11 and includes a spring 748 to apply additional force to pivot valve member 718 about the pivot hinge 716 as a closing mechanism that facilitates proper seating of valve member 718 against sealing surface 734 of body member 712.

Figure 12:
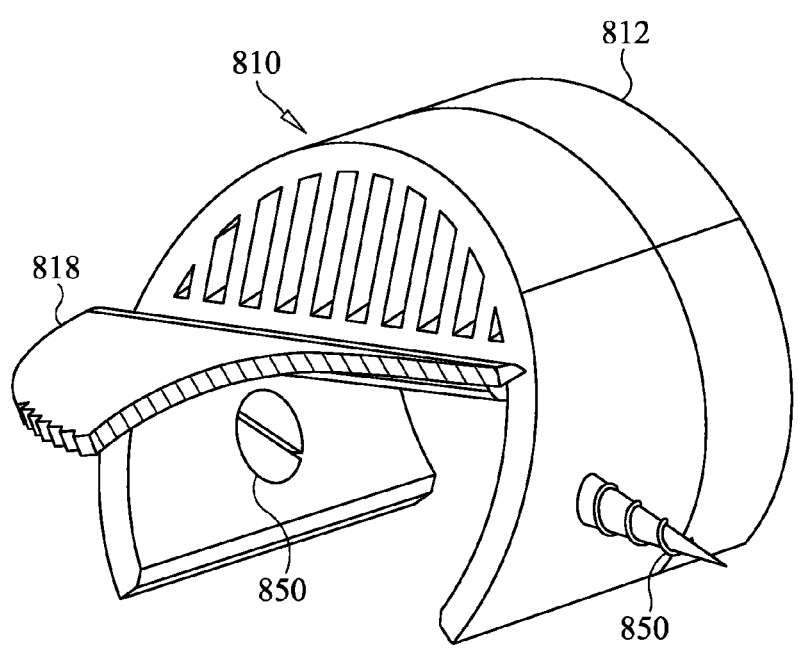
FIG. 12 is a perspective view of an alternative embodiment of the present valve device generally in accordance with FIG. 1 and demonstrating an embodiment of a securing device to mount the check valve to the drain pipe.
Figure 13:
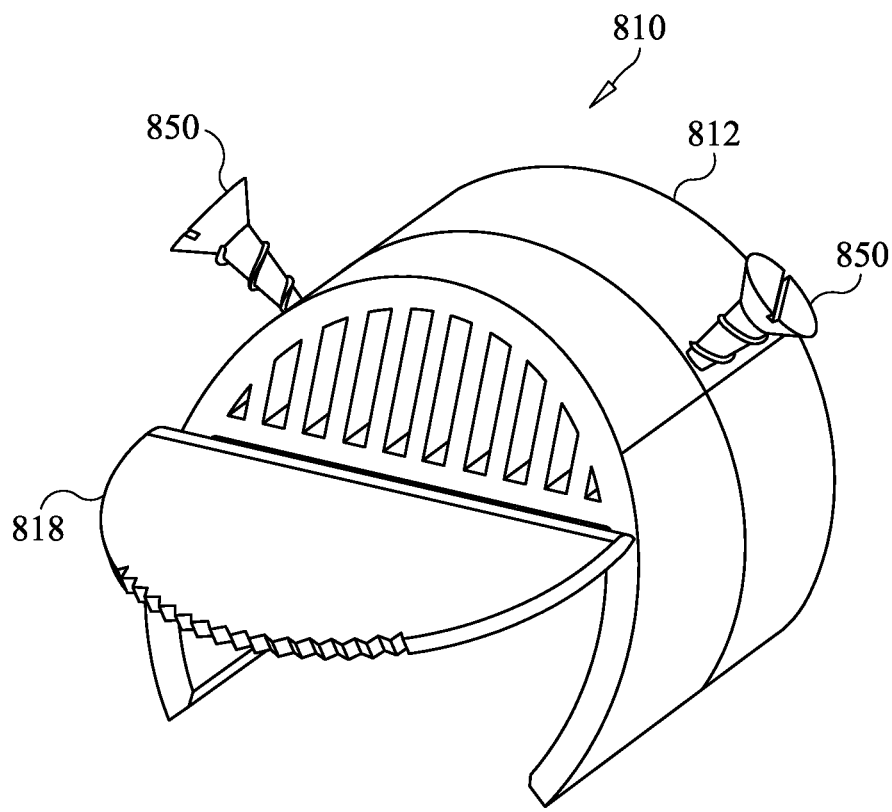
FIG. 13 is a perspective view of an alternative embodiment of the present check valve device generally in accordance with FIG. 1 and demonstrating an alternative embodiment to that of FIG. 12 for mounting the check valve to the drain pipe.

As depicted in FIGS. 12 and 13, numerous embodiments of the present check valve device will be affixed in place in the drain pipe through the use of fasteners 850 that are screwed or otherwise fastened through the interior of body member 812 into the interior drain pipe (FIG. 12) or through the exterior of the pipe into the exterior of body member 812 (FIG. 13). Clearly however, this and other methods of attachment of the check valve to the drain pipe are equally applicable whether the check valve is configured to mount on the interior of the exterior of the drain pipe.

Figure 14:
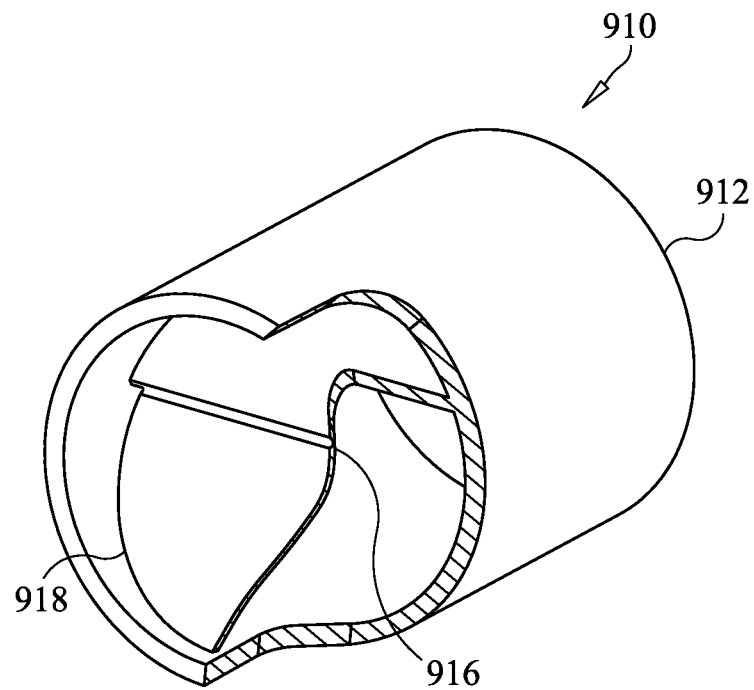
FIG. 14 is a perspective view with portions broken away of an alternate embodiment of the present check valve device demonstrating an integrally hinged embodiment of the valve member molded into a drain pipe or body member.

As depicted in FIG. 14, additional embodiments of the present check valve device 910 include body member 912 attached to valve member 918 that is hinged on a so called 'living hinge' or integral pivot hinge 916. The pivot hinge 916 is the point of connection between valve member 918 and body member 912 established during the manufacturing process.

All patents and patent applications cited in this specification are hereby incorporated by reference as if they had been specifically and individually indicated to be incorporated by reference.

Although the foregoing invention has been described in some detail by way of illustration and Example for purposes of clarity and understanding, it will be apparent to those of ordinary skill in the art in light of the disclosure that certain changes and modifications may be made thereto without departing from the spirit or scope of the appended claims.

The invention claimed is:

1. A check valve for deterring intrusion into drain pipes comprising:
    a generally inverted U-shaped body member having an orifice adaptable to mount securely within an exit opening of a drain pipe, wherein the drain pipe is adapted to promote fluid flow in a single direction;
    a valve member pivotably mounted on said body member so as to provide a closed position that substantially occludes said orifice and a range of open positions when said valve member is pivoted to open in said flow direction;
    wherein the mounting of the valve member is oriented such that the force of gravity promotes the valve member toward the closed position; and
    wherein the mounting of the body member within the exit opening of the drain pipe is enabled because two end portions of the U-shaped body member exhibit enough outward mechanical pressure on an inside surface of the drain pipe to securely retain the body member in its mounted position during normal conditions of drainage flow or backpressures.

2. The check valve as recited in claim 1 wherein the two end portions of the U-shaped body member include one or more barbs.

3. The check valve as recited in claim 2 wherein the two end portions of the U-shaped body member include one or more hinge regions.

4. The check valve as recited in claim 3 wherein a lowest edge portion of the valve member exhibits a serrated profile.

* * * * *